United States Patent
Waters et al.

(10) Patent No.: US 7,227,592 B2
(45) Date of Patent: Jun. 5, 2007

(54) SELF-CORRECTING REAR PROJECTION TELEVISION

(75) Inventors: Richard C. Waters, Concord, MA (US); Jay E. Thornton, Watertown, MA (US); Ramesh Raskar, Cambridge, MA (US); Mamoru Kato, Lexington, MA (US); Paul H. Dietz, Hopkinton, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 706 days.

(21) Appl. No.: 10/672,584

(22) Filed: Sep. 26, 2003

(65) Prior Publication Data

US 2005/0068466 A1    Mar. 31, 2005

(51) Int. Cl.
*H04N 9/28* (2006.01)
*H04N 3/23* (2006.01)
*H04N 9/31* (2006.01)

(52) U.S. Cl. ............... 348/745; 348/806; 348/807; 348/744

(58) Field of Classification Search ............ 348/745, 348/744, 746, 806, 805, 807, 227.1; 315/368.11, 315/368.24; 359/453, 456; 353/69; 345/647
See application file for complete search history.

(56) References Cited

U.S. PATENT DOCUMENTS

| | | | | |
|---|---|---|---|---|
| 4,316,211 A | * | 2/1982 | Mackey et al. ............ 348/180 |
| 4,835,602 A | * | 5/1989 | Duwaer ..................... 348/746 |
| 5,311,309 A | * | 5/1994 | Ersoz et al. ............ 375/240.12 |
| 5,475,447 A | * | 12/1995 | Funado ..................... 348/745 |
| 5,793,340 A | * | 8/1998 | Morita et al. ................ 345/7 |
| 5,939,843 A | * | 8/1999 | Kimoto et al. ........ 315/368.12 |
| 6,404,462 B1 | | 6/2002 | George ..................... 348/806 |
| 6,480,242 B1 | * | 11/2002 | Okada et al. .............. 348/807 |
| 6,618,076 B1 | * | 9/2003 | Sukthankar et al. ........ 348/180 |
| 6,707,509 B2 | * | 3/2004 | Chauvin et al. ........... 348/745 |
| 6,814,448 B2 | * | 11/2004 | Ioka ............................ 353/69 |
| 6,816,187 B1 | * | 11/2004 | Iwai et al. .................. 348/187 |
| 6,836,298 B2 | * | 12/2004 | Song et al. ................ 348/745 |
| 6,979,087 B2 | * | 12/2005 | Honig et al. ............... 353/121 |
| 7,001,023 B2 | * | 2/2006 | Lee et al. .................... 353/69 |
| 7,015,955 B2 | * | 3/2006 | Funston et al. .......... 348/223.1 |
| 2001/0054990 A1 | * | 12/2001 | Nakamura et al. ........... 345/32 |

* cited by examiner

*Primary Examiner*—Michael Lee
*Assistant Examiner*—Jean W. Désir
(74) *Attorney, Agent, or Firm*—Dirk Brinkman; Clifton D. Mueller; Gene V. Vinokur

(57) ABSTRACT

In a rear projection television, cathode ray tubes are mounted inside an enclosure so that each cathode ray tube projects output images onto a rear projection screen using a corresponding electron beam. Calibration images are generated for each cathode ray tube. A camera, also mounted inside the enclosure, acquires an input image of each calibration image. A distortion in each input image is measured, and the output images of the cathode ray tubes are corrected by adjusting the signals controlling the corresponding electron beams according to the distortion.

27 Claims, 10 Drawing Sheets

SELF-CORRECTING REAR PROJECTION TELEVISION

FIELD OF THE INVENTION

This invention relates generally to rear projection televisions, and more particularly to correcting convergence errors in CRT-based projection televisions.

BACKGROUND OF THE INVENTION

In a CRT-based projection television (PTV), three CRTs project colored (RGB) images onto a rear projection screen. Typically, the images are reflected by a mirror, which lengthens the optical path to produce a larger output image. Because the three CRTs are positioned at three different locations, the projected images can be distorted in various ways. If these distortions are not corrected or "converged," then the projected images are blurred and have objectionable color fringe artifacts.

Typically, convergence errors are measured and corrected at the factory prior to distribution. However, due to physical, electrical, optical, and magnetic factors, it is often difficult to maintain convergence over time. Many prior art PTV's provide manual adjustment to fine tune the convergence, but users prefer an automatic method.

Therefore, manufacturers have developed automatic methods for performing the convergence correction. U.S. Pat. No. 6,404,462 "Digital convergence image," issued to George on Jun. 11, 2002, describes convergence correction in a PTV where individual photo sensors are positioned adjacent to projection screen edges. CRTs generate a raster image for illuminating the projection screen and the photo sensors. Signals derived from the photo sensors are used for convergence alignment. In another similar method, optical fibers are placed next to the screen to send light to detectors to determine alignment errors.

The prior art techniques generally measure alignment at a few isolated locations. At best the locations are at an extreme periphery of the projected image because placing the detectors on the screen would interfere with the projected images.

SUMMARY OF THE INVENTION

In a rear projection television, cathode ray tubes are mounted inside an enclosure so that each cathode ray tube projects output images onto a rear projection screen using a corresponding electron beam.

Calibration images are generated for each cathode ray tube. A camera, also mounted inside the enclosure acquires an input image of each calibration image.

A distortion in each input image is measured, and the output images of the cathode ray tubes are corrected by adjusting the signals controlling the corresponding electron beams according to the distortion.

DETAILED DESCRIPTION OF THE PREFERRED EMBODIMENT

Figure 1:
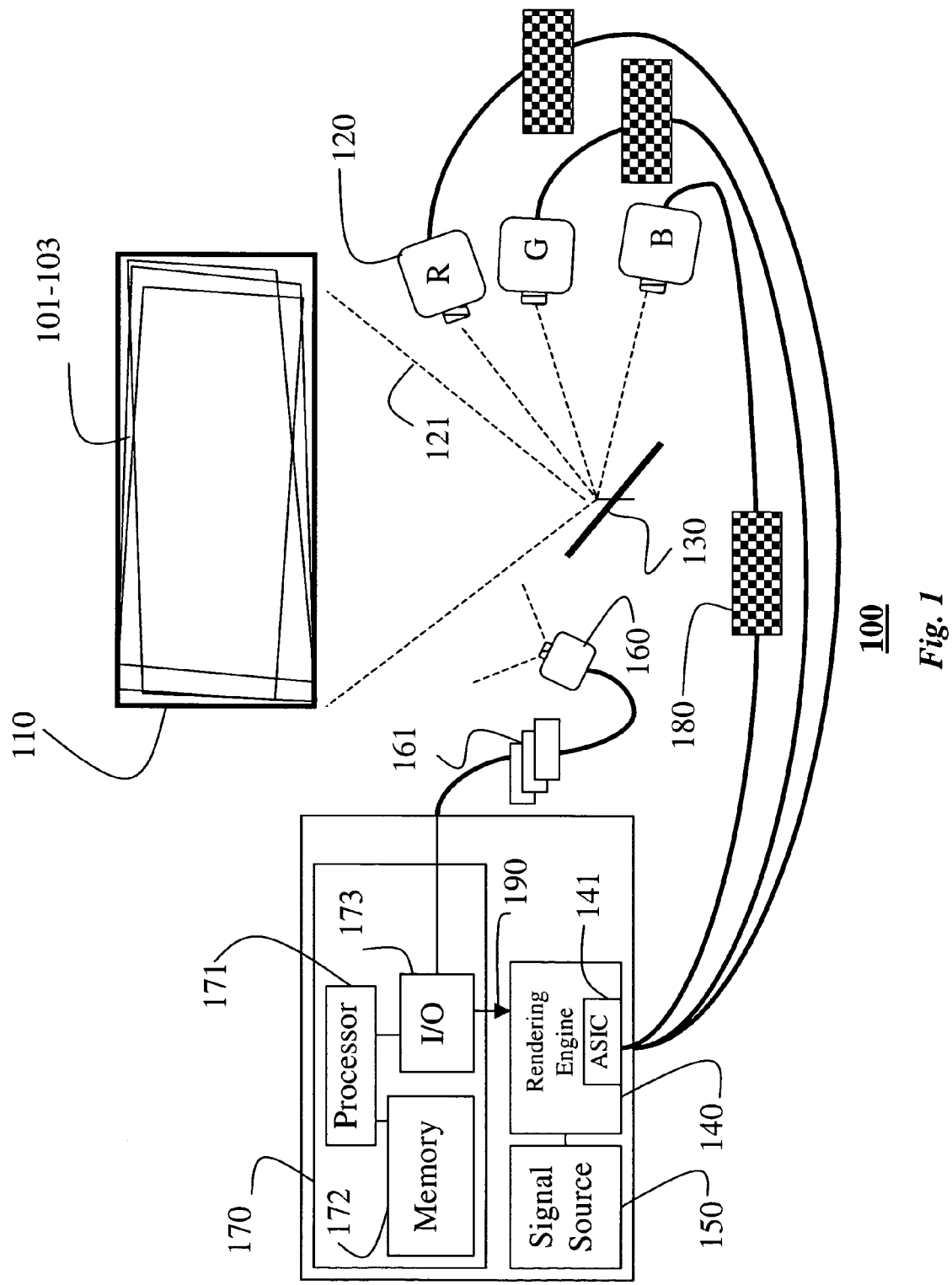
FIG. 1 is a block diagram of a self-convergent projection television (PTV) according to the invention.

FIG. 1 shows a self-convergent projection television (PTV) 100 according to our invention. Three images 101–103 are projected onto a rear projection screen 110 by three CRTs 120 (RGB). Each CRT produces images consisting of an n×m array of pixels, which determine an aspect ratio of the images.

The images 101–103 are usually projected via a mirror 130 to increase the size of the projected images 101–103 by lengthening the optical paths 121. The images can be generated by a rendering engine 140. The rendering engine can be in the form of a raster generator, graphics hardware card, or a an application specific integrated circuit (ASIC) 141. The rendering engine can be coupled to a signal source 150, such as, a television receiver, video player, graphics hardware, computer, and the like, as known in the art.

The PTV also includes a computer system 170 comprising a processor 171, memory 172, and I/O interface 173 connected by buses to each other and the rendering engine 140. The computer is also connected to a camera 160, e.g., a VGA (640×480) camera.

Due to the fact that the three CRTs 120 have different poses, i.e., position and orientation, and other variable physical, electrical, optical, and magnetic factors, the images 103 can become misaligned and distorted.

Therefore, we provide means for correcting the output image to solve this divergence problem. The camera 160 is mounted in a fixed physical relationship to the rear of the projection screen 110 inside the PTV 100. That is, the camera 160 is on the same side of the screen as the CRTs 120. The camera acquires input images 161 corresponding to the projected images 101–103. That is, the input images 161 correspond to the actual entire output images 101–103.

Introducing the camera 160 as a sensor of the output image has the advantage that an entire output image can be viewed and corrected, unlike the individual photo diodes of the prior art placed at the periphery of the output image.

However, with a camera, there are a number of practical problems. Because the screen 110 must be transparent to light, the amount of ambient or background light outside the PTV enclosure can overwhelm the response level of the camera's sensors. In fact, the amount of ambient light is much larger than the amount of light reflected back to the camera 160 from the CRTs 120. Thus, the signal-to-noise ratio is quite low.

This can be corrected by using a shorter exposure in a situations where the room is brightly lit. However, if the exposure is less than $1/60^{th}$ of a second, i.e., the frame rate of the CRTs, only a partial image is traced out by the scanning electron beam. This means that several successive input images 161 have to composited together as a mosaic to obtain an image of the entire calibration pattern. However, this can be used as an advantage because the partial images have 'unscanned' portion, which is all background light, which can be subtracted out to improve the SNR.

The ambient light can include spot-light effects from floor, wall, or directed ceiling lamps. This causes large variations in the detected light requiring compensation.

Figure 10B:
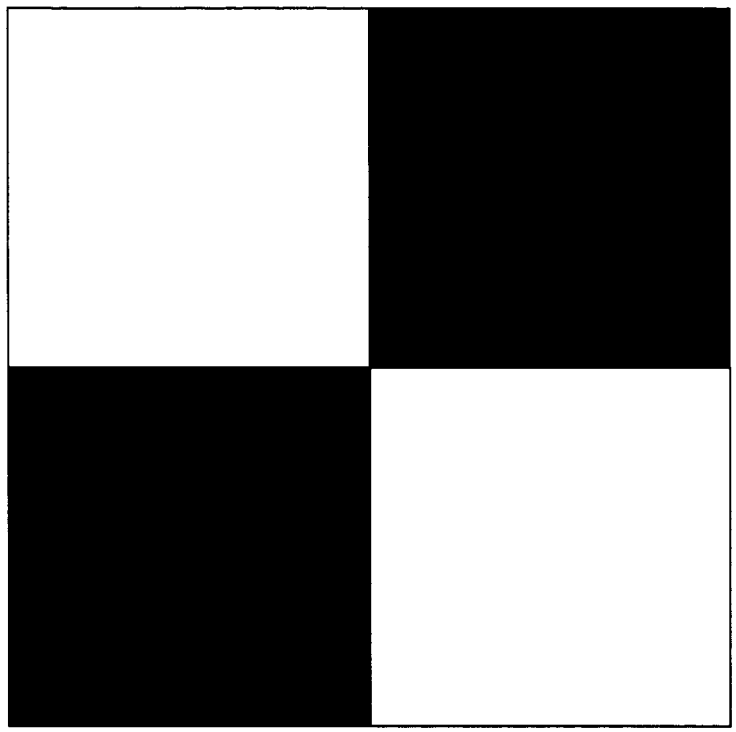
FIG. 10A–10B are positive and negative versions of a calibration pattern pair.
Figure 10A:
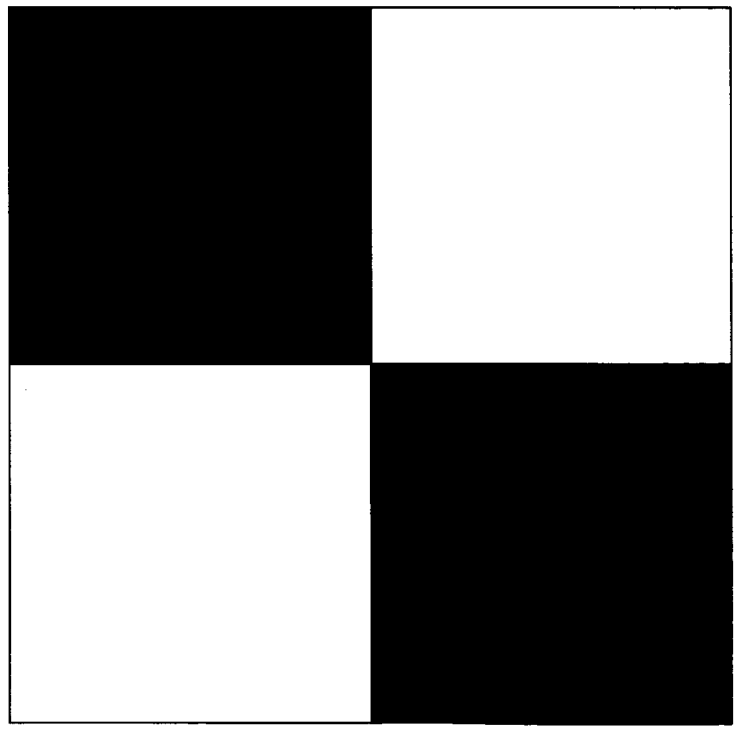

As shown in FIGS. 10A–10B, the effects of ambient light can be cancelled by using calibration patterns in the form of positive and negative images, i.e., by inverting the grayscale relationships in successive pairs of calibration images. In this case, during the analysis, the negative image is subtracted from the positive image and any constant ambient light effect is cancelled, leaving only the modulation that is measured.

In addition, most PTVs include screen components that are designed to improve viewing angle and clarity from the outside, These components can include various combinations of bulk diffusers, surface diffusers, beads, Fresnel and lenticular lenses, prisms, diffraction gratings, polarizers, and so forth. These components cause localized artifacts in the input images back-scattered from the rear of the screen. One can delete or compensate for these artifacts.

To minimize the increase in cost, it is desired to use an inexpensive camera, e.g., less than $20. Such cameras are available. However, such cameras have a large radial distortion, and low resolution. In fact, the resolution is substantially lower than the pixel resolution of the CRTs, Yet, it is desired to use an uncalibrated camera, and resolve the resolution of the distortion to a sub-pixel level.

Therefore, we project predetermined calibration patterns 180. For example, the calibration pattern is a checkerboard pattern with N×M black and solid color rectangles. FIGS. 9A–9E show some example multi-resolution patterns. The corner 900 of the pattern of FIG. 9A can be used to quickly locate the center of the screen 110 and perform an initial correction. Each successive pattern refines the correction to a greater resolution. It should be noted that under reasonable lighting conditions, the single high resolution pattern of FIG. 9E may suffice.

The calibration patterns 180 are generated by the ASIC 141 of the rendering engine 140 or by the processor 171 itself. Input images 161 of the calibration patterns 180 are analyzed by the computer system 170. The system 170 measures the locations of the corners of the rectangles of the calibration patterns. The locations are used to determine error signals 190 that are a relative displacement of the corners from where they should be located.

The error signals 190 reflect a distortion of the RGB images 101–103. The error signals can be expressed as vectors (x, y) that give a direction and magnitude of local displacement errors. By minimizing the error signals, the output image is corrected. The error signals are used to optimally converge the output RGB images 101–103. It should be noted that the positions that produce the error signal can also be used to correct scale, translation, distortion, brightness, aspect ratio, and overscan, as well as diminish burn-in effects.

Figure 2:
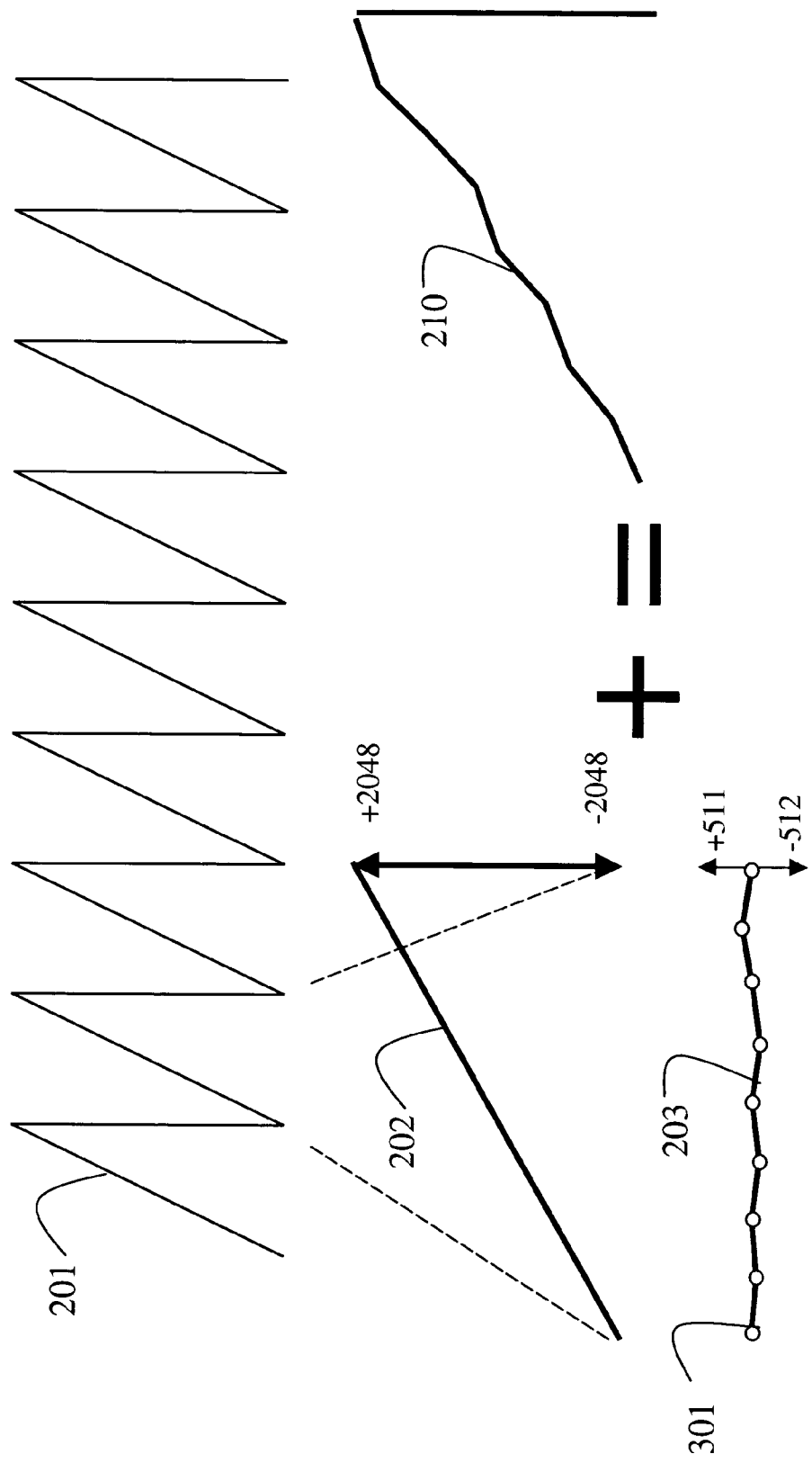
FIG. 2 illustrates a saw-tooth signal generated and manipulated by the PVT according to the invention.
Figure 3:
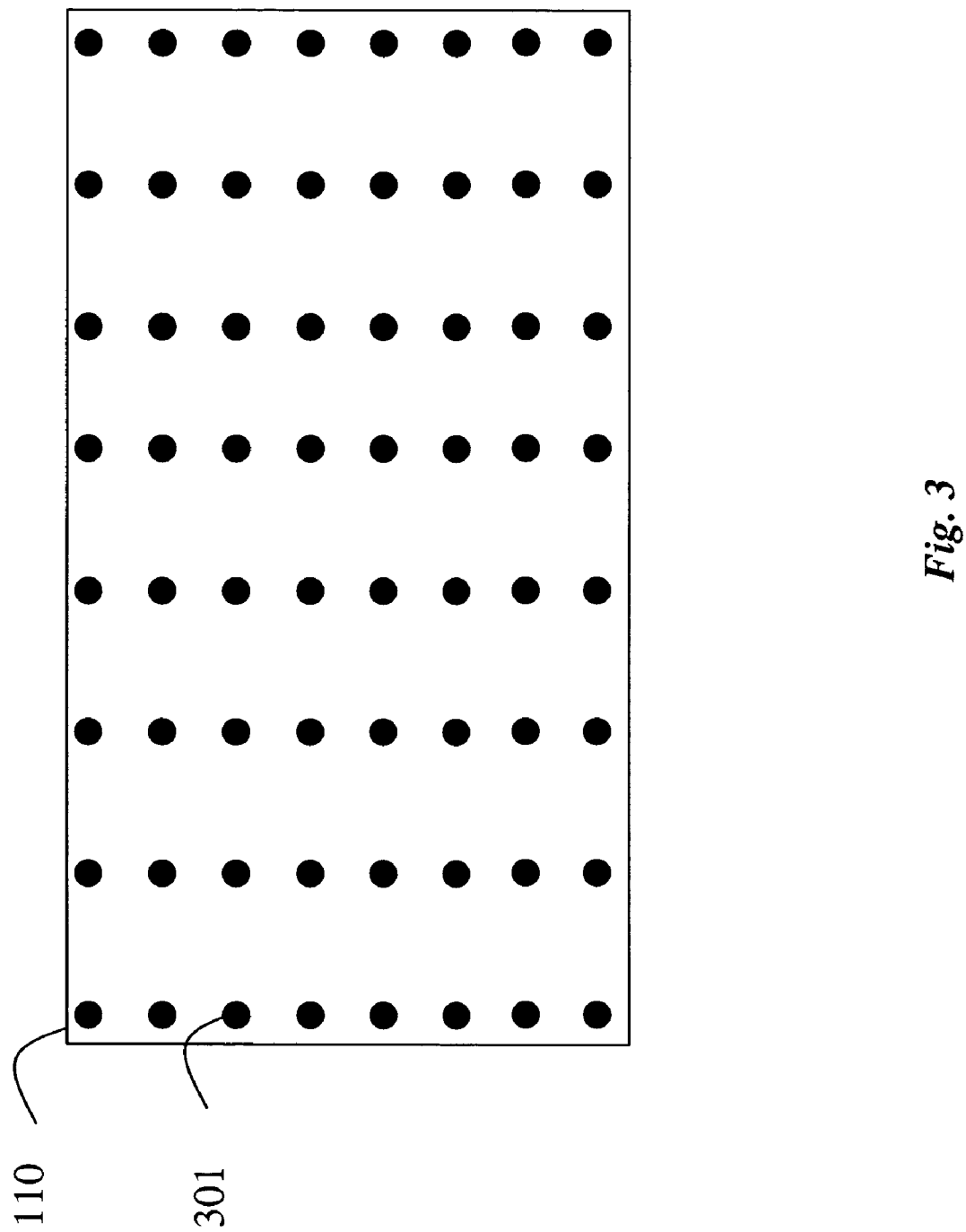
FIG. 3 is a block diagram of control points used by the invention.

As shown in FIG. 2, the ASIC 141 also generates horizontal and vertical saw-tooth signals 201 that control the deflection of each CRT electron beam via conventional deflection amplifiers and deflection coils. The ASIC includes writeable registers that adjust scanning characteristics. The adjustments can include coarse adjustment, i.e., translation, and scale, and interpolated fine adjustment As shown in FIG. 3, the fine adjustment corresponds to control points 301 and the coarse adjusts correspond to the slope and offset of the saw-tooth signals 202. The control points 301 are arranged in an array covering the projection screen 110. The control points are implemented as fine adjustment registers in a scan generation portion of the ASIC. By writing to these registers of the ASIC 141, each horizontal and vertical saw-tooth signal 200 can be adjusted coarsely and finely at several points to globally and locally control the electron beam. As shown, the fine adjustment 203 can be as much as ¼ of the course adjustment 202.

The final saw-tooth signal 210 is a sum of the coarse adjustment signal 202 and the fine adjustment signal 203. The fine adjustment signal is interpolated between the control points 301, similar in the way that control points curve a spine. Because the interpolation, e.g., bi-linear, alters the scanning signal smoothly, the projected images are globally and locally warped so that pixels in the neighborhood of a control point are displaced by a corresponding amount. The amount of warping decreases smoothly for pixels further away from a particular control point. Note that other methods for warping and interpolating the output images 101–103 can be employed.

We use the checkerboard pattern 180 to define the locations of the corners of the squares in the pattern. By comparing the positions of corresponding corners in the input RGB images 161, we obtain a local measure of the convergence error 190, or displacement, at each corner of the squares in the checkerboard calibration pattern to enable fine adjustment at each control point so that the entire image is in optimal convergence after warping. Thus, the invention can correct for convergence and distortion among several concurrent output images due to misalignment of the CRTs, as well as convergence and distortion within a single output image.

The local convergence error signal 190 at a corner in one image is an (x, y) vector that corresponds to a difference between the locations of that corner and a corresponding corner in another image. We align the R and B image to the G image.

Figure 4:
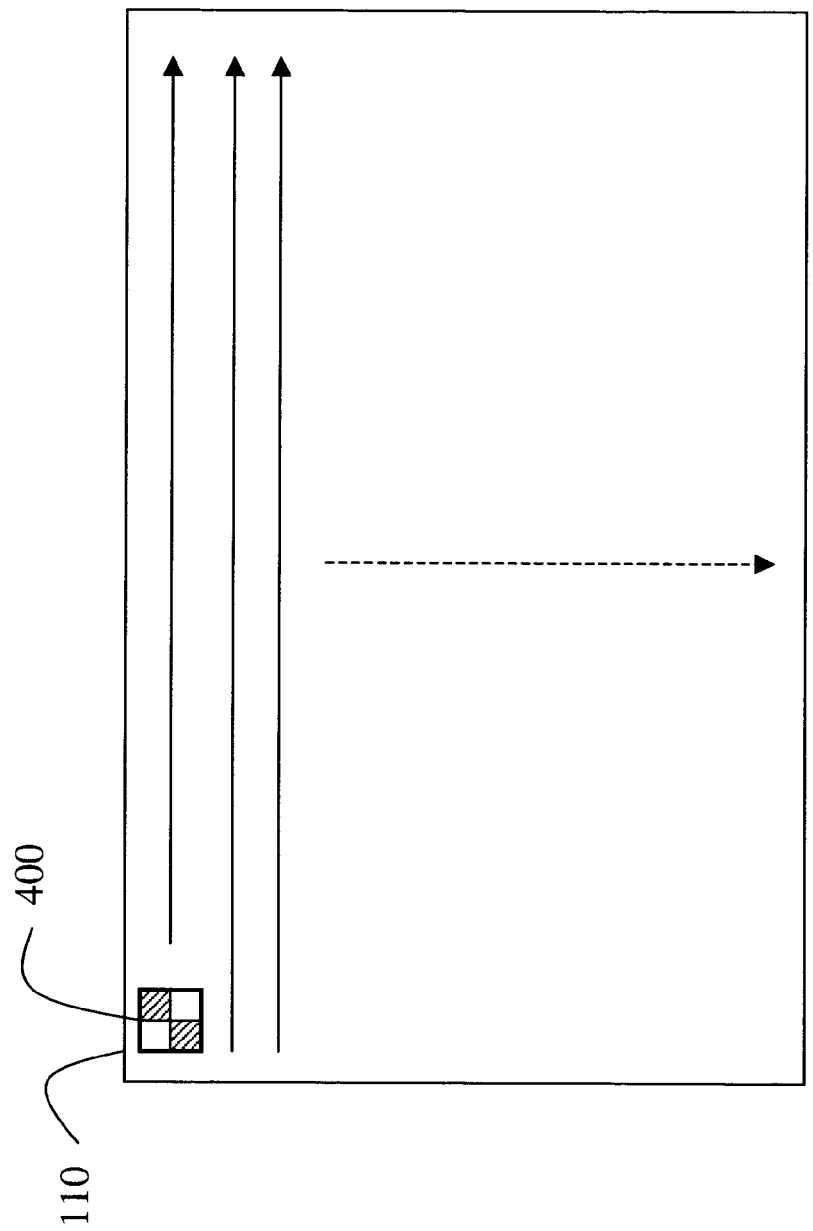
FIG. 4 is a block diagram of scanning a kernel over input images.

As shown in FIG. 4, we use a 2×2 filter kernel 400 to locate the corners in the checkerboard pattern. The solid color (R, G or B) is indicated with no lines, and black is indicated with slanted lines. The 2×2 kernel is an idealized 2×2 portion of the output calibration pattern, i.e., a "matched filter" composed of positive ones and negative ones. This kernel is scanned across the input image, left-to-right, and top-to-bottom, one camera pixel at the time. The kernel is convolved at each pixel location to obtain filtered intensity values. That is, at each pixel location, the kernel values are used to weight the image gray values in a weighted summation.

If the kernel is aligned with a 2×2 portion of the calibration pattern, then the summed intensity response due to the filtering is maximized. If the kernel is anti-aligned, i.e., a solid color rectangle is aligned with a black rectangle, the summed intensity response is minimized.

Figure 5:
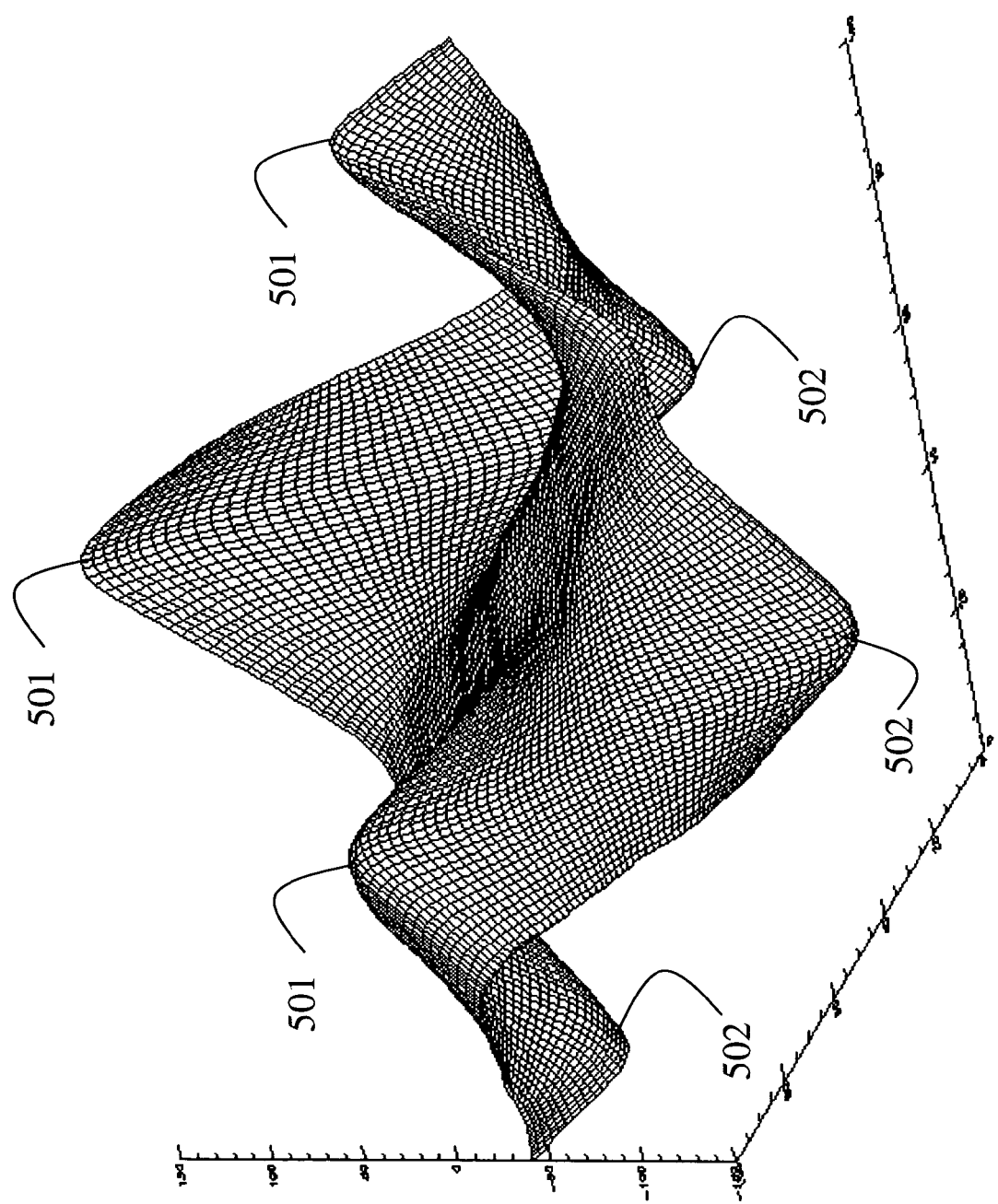
FIG. 5 is a block diagram of intensity values measured by the kernel of FIG. 4.

As shown in FIG. 5, these maxima 501 and minima 502 correspond to the locations of the corners of the checkerboard pattern. In FIG. 5, the x and y axes are marked in pixel units, and the z axis are relative intensity after filtering.

The 2×2 kernel 400 is selected because this kernel is separable and easy to determine. This is equivalent to two 1-D convolutions, rather than requiring a 2-D convolution. The advantage is that only addition and subtraction is required to locate the corners. Because the kernels are large, these advantages are important.

The pixel locations of the maxima and minima are easily obtained to the nearest pixel. However, that precision is insufficient to correct convergence to a tolerance of less than one mm. With a low resolution camera, each camera pixel covers about three to four mm for a large projection screen.

Therefore, we determine the maxima and minima to sub-pixel accuracy over the entire image. We take advantage of the fact that the structure in the exact pixel gray levels around the maxima and minima contain information about the peak location. In practice, we extract this sub-pixel information by fitting a $2^{nd}$ order polynomial model to the response in the vicinity of the peak. Then, we solve for a maximum of the polynomial. The recovered locations have a standard deviation of about 0.2 camera pixels.

Given the convergence error signal 190, the required correction by the fine adjustment signal 202 can be determined using a linear system model. Linear systems are well known in the art. The linear system model is calibrated by considering each control point 301 in turn, perturbing the control point by a fixed amount, and then measuring the corresponding change in corner locations from the acquired images 161, i.e., the error signal 190.

The linear system model can be inverted to determine a change in the control point registers needed to effect a particular movement of the corners of the checkerboard pattern on the projection screen 110. Repeating the measuring and correcting eventually compensates for any lack of precision in the model. In practice, two passes are usually sufficient to correct large convergence errors, and a single pass can correct a minor misalignment.

The first step to calibrate the linear system model is to quantify an influence of each control point on each corner location. This can be done by brute force. Each control point is altered, one at a time, by a constant amount, first in the x direction, and then in the y direction. We measure a change in location of the corners in the pattern.

All the measurements can be organized into a matrix A. The columns correspond to the control points and the rows correspond to the corners of the pattern. The $(i, j)^{th}$ entry is the displacement vector of the $j^{th}$ corner when the $i^{th}$ control point is perturbed.

Given the matrix A, it is possible to calculate the positions of all corners for a given arbitrary change in the fine adjustment values. However, the convergence correction problem is slightly different. We start with arbitrary error signals 190 at the corner locations, and need to calculate the change in fine adjustment signal 203 of the control points that are necessary to minimize the error signal or distortion.

This can be accomplished by multiplying the error with a pseudo-inverse of the matrix A. For a non-linear system, this correction is a $1^{st}$ order Taylor expansion correction, and applicable for small local corrections. For the PTV 100, the ASIC 141 is linear, and there are only a small number of components with very small non-linear responses, e.g., the optical components. Therefore, the linear correction technique according to the invention holds well and can make large corrections with small errors, and thus converges very quickly.

In special cases, where the checkerboard pattern has corners aligned substantially with the control points 130, the linear correction matrix takes on a particularly simple form because the fixed corner point/control point relationships cause matrix rows to be simply shifted versions of other rows. This duplication means that the matrix can be calculated quickly and easily.

OTHER APPLICATIONS

Geometry Correction via Camera Calibration

As stated above, we converge the red and blue projector to the green projector. However, this requires that the alignment of the green projector is made more "correct" than the other two projectors during manufacture. The correction of the green projector is a separate manufacturing step, and "correctness" can deteriorate over time.

Better criteria for "correct" are that straight lines are rendered straight, parallel lines parallel, and that individual pixels are rendered at appropriate locations on the screen. By calibrating the camera 160, we can measure geometry errors using the same checkerboard corner finding procedures used in convergence.

Figure 6:
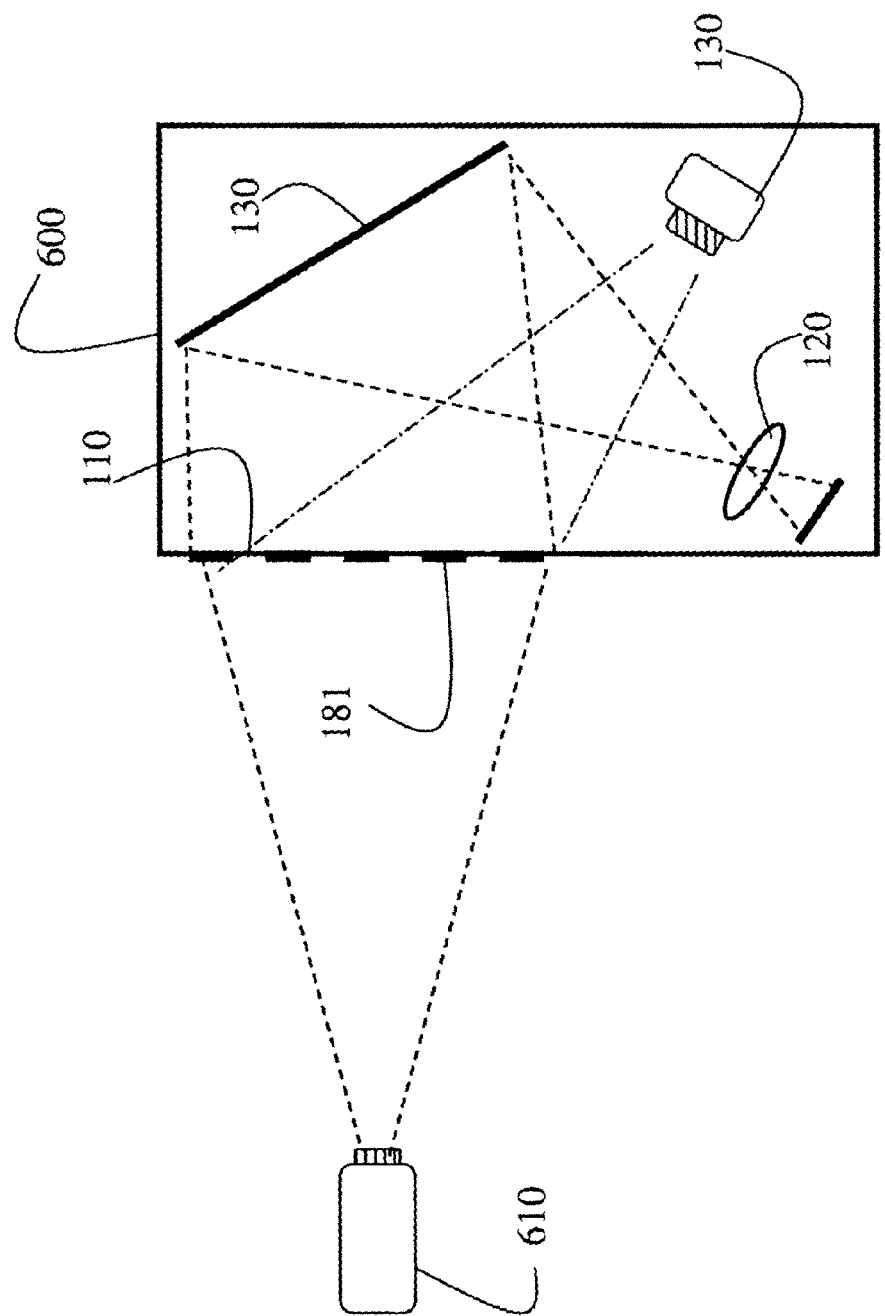
FIG. 6 is a side view of the PVT with a second calibration pattern.

As shown in FIG. 6, we calibrate the camera 160 in the PVT enclosure 600 with a second projector 610. This projector projects a second calibration pattern 181 on to the front of projection screen 110 mounted in the housing.

Alternatively, one can simply place a physical checkerboard pattern board, which is partially transparent, on the screen itself and illuminate the pattern with uniform light from outside the PTV 100. The camera 160 measures the correct locations of the corners of the pattern, and stores the locations in the memory 172 for later use.

Overscan Minimization

To decrease the likelihood that the output image is ever smaller than the projection screen to cause annoying black edges, the amount of overscan for the PVT is generally set conservatively. Overscan occurs when the output image is larger than the projection screen 110. Overscan minimizes black margins at the edge of the projection screen. As a result, the viewed image is usually a cropped form of the output image. This is inconsequential for most traditional video applications. However, many computer software applications and games have narrow tool, banner, and slide bars at the extreme edges of output images. Overscan can crop this important information away.

With the camera 160, it is possible to determine precisely the extent of the output image with respect to the projection screen. Therefore, it is possible to adjust the vertical and horizontal position and extent to correspond to the exact screen location and size. This technique can also be used for projective televisions that use LEDs, LCDs or DLPs, instead of CRTs.

Preventing Burn-In

The light emitting phosphor coating of the CRTs ages with repeated stimulation. This causes less light output over time. This is particularly true when a particular pattern, e.g., a channel number or a digital clock, is shown repeatedly to cause a visible shadow or "burn-in" of the pattern.

A conventional method for avoiding burn-in constantly shifts the pattern so that adjacent portions of the screen are stimulated. The camera 160 can be used to detect constantly displayed patterns inside the PTV, and shift the output images accordingly to prevent burn-in.

Figure 7:
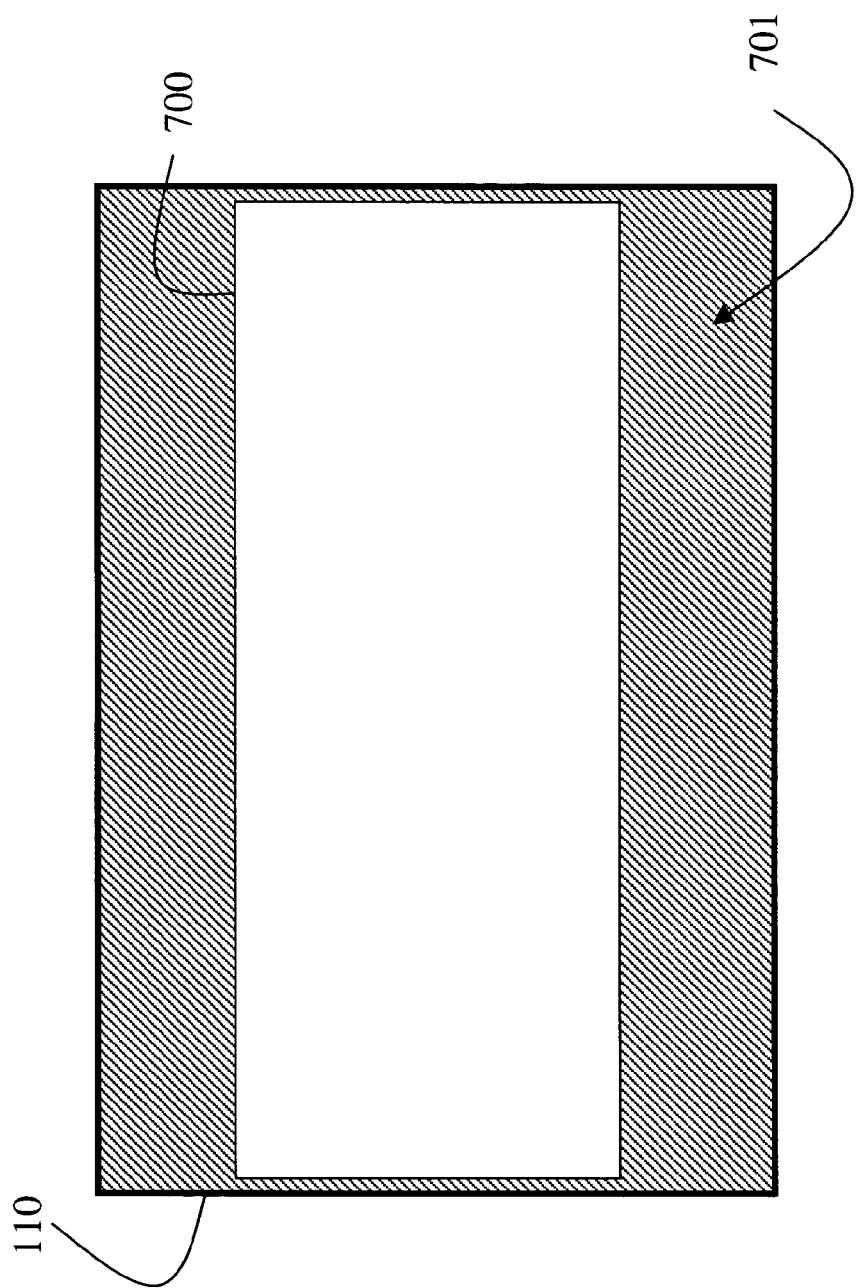
FIG. 7 is a front view of the PVT with a letter-box image.

As shown in FIG. 7, burn-in can also be caused by displaying an image 700 that has a different format, e.g., 'letterbox', than the format of the projection screen 110. This is particularly true if the image 700 is shown for a long time. Because the intensity of the projected beam inside the area 700 is much higher than outside 701 the area, the inside area appears burnt out when a regular format sized image is shown at a later time.

This problem can be solved in two ways. First, the image can be resized to fit the screen 110 by cropping the two sides. Second, the outside area 701 can be illuminated with a neutral or grey color, e.g., an intensity that is an average of the intensity of the inside area 700.

Auto Dimming

Another way to avoid burn-in is to decrease the intensity of the output images, i.e., brightness. This is acceptable in a dark room, but less acceptable in a bright room where room light causes the PTV to look washed out. The camera 160 can be used as a light meter to measure the amount of ambient light, and adjust the intensity of the output images accordingly. This technique can also be used for projective televisions that use techniques other than CRTs.

Laser Pointing

Figure 8:
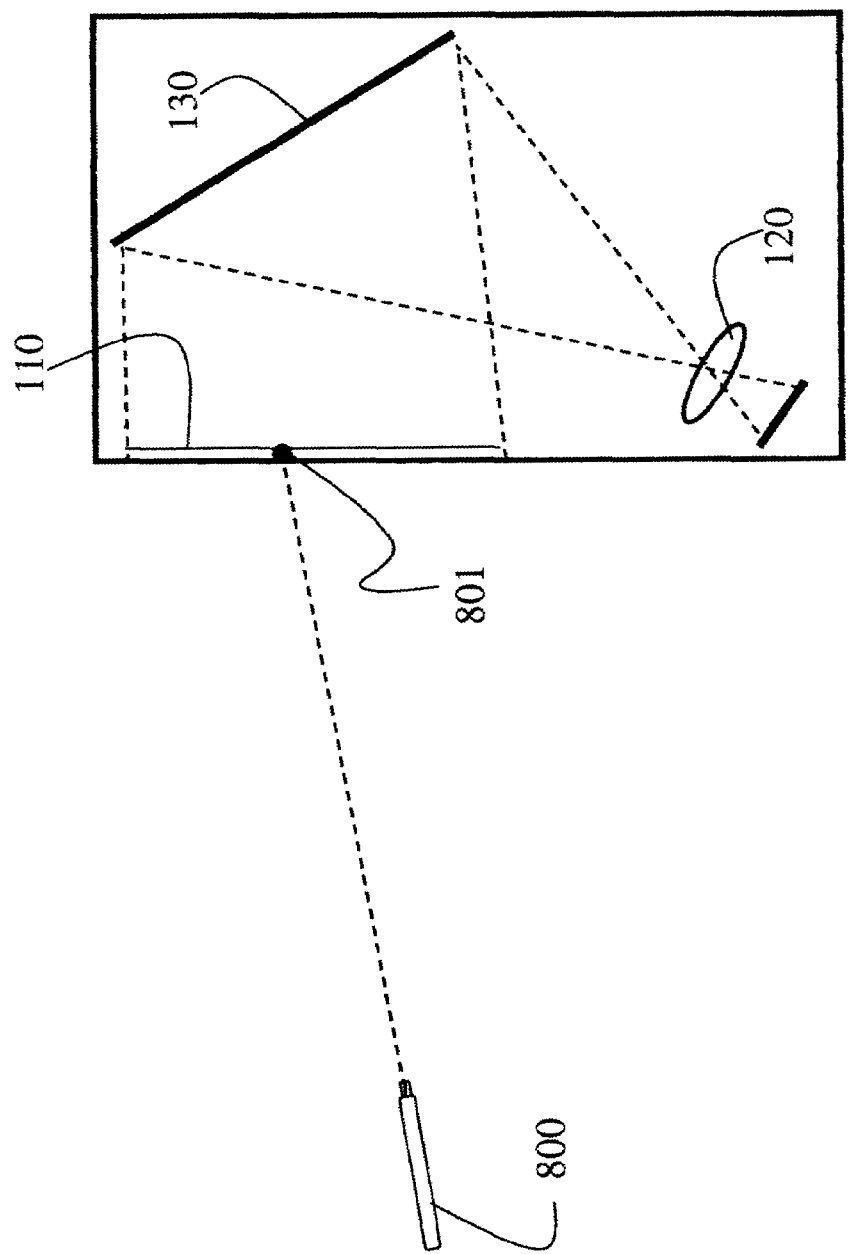
FIG. 8 is a side view of the PVT operated by a laser pointer.
Figure 9A:
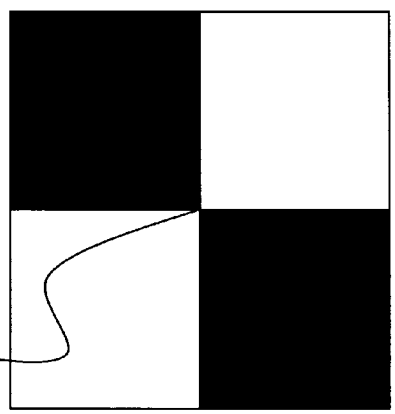
FIG. 9A–9B are calibration patterns according to the invention.
Figure 9B:
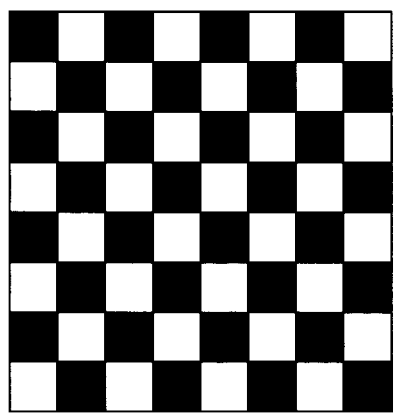
Figure 9C:
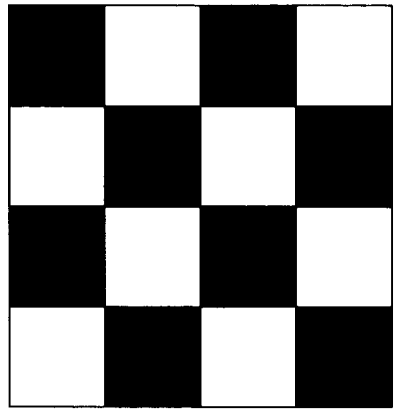
Figure 9D:
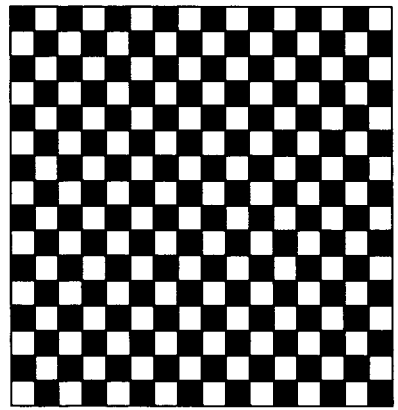
Figure 9E:
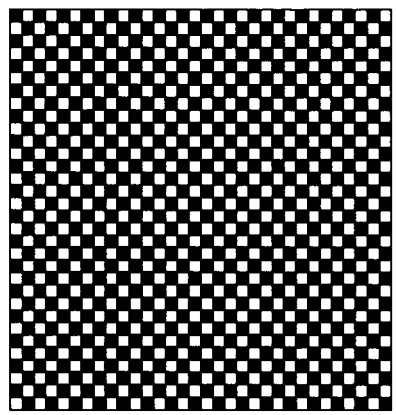

As shown in FIG. 8, the camera 160 can also detect a light beam aimed at the screen by, for example, a laser pointer 800. The laser pointer can be incorporated into a remote control unit. The laser-pointer sized dot 801 generates a significant, unmistakable signal in the input images 161. Thus, the pointer can be used to make menu selections, or control interactive applications such as computer games. If the laser beam is pulsed, and the pulse length for different lasers is different, then multiple lasers dots can be identified and located concurrently. Note that this use of the camera to detect a laser beam is applicable to other rear projection technologies.

It should be noted that manipulating the output images as described above will also work for a rear projection television with a single CRT. For example, the system can correct a single image for scale, translation, distortion, brightness, aspect ratio, overscan, burn-in, and so forth.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. An apparatus for correcting convergence errors in a rear projection television, comprising:
    a cathode ray tube mounted inside an enclosure, the cathode ray lube configured to project output images onto a rear projection screen using an electron beam, in which a deflection of the electron beam is controlled by signals, the signals for controlling the electron beam including coarse and fine saw-tooth signals for horizontal deflection, and coarse and fine saw-tooth signals for vertical deflection;
    a camera, mounted inside the enclosure, the camera configured to acquire an input image of a calibration pattern displayed on the rear projection screen by the cathode ray tube;
    means, coupled to the camera, for measuring a distortion in the input image; and
    means, coupled to the cathode ray tube, for converging the output images by adjusting the signals controlling the electron beam according to the distortion.

2. The apparatus of claim 1, further comprising:
    a plurality of cathode ray tubes mounted inside an enclosure, each cathode ray tube con figured to project the output images onto the rear projection screen using a corresponding electron beam;
    means for generating calibration images for each cathode ray tube, and wherein the camera is configured to acquire the input image of each calibration image;
    means, coupled to the cameras, for measuring the distortion in each input image; and
    means, coupled to each cathode ray tube, for converging the output images of the plurality of cathode ray tubes by adjusting the signals controlling the corresponding electron beams according to the distortion.

3. The apparatus of claim 1, in which an intensity of the electron beam is controlled.

4. Vim apparatus of claim 1, in which the calibration pattern is a checkerboard of rectangles.

5. The apparatus of claim 4, further comprising:
    means for measuring a relative displacement of corners of the rectangles.

6. The apparatus of claim 1, further comprising:
    an adder configured to sum the corresponding coarse and fine saw-tooth signals.

7. The apparatus of claim 1, in which each fine saw-tooth signal is adjusted according to a plurality of control points.

8. The apparatus of claim 7 in which the plurality of control points correspond to a plurality of locations evenly distributed over the rear projection screen.

9. The apparatus of claim 5, further comprising:
    means for scanning a filter kernel across the input image to measure the relative displacement of the corners of the rectangles.

10. The apparatus of claim 9, in which the filter kernel is a 2×2 checkerboard pattern.

11. The apparatus of claim 10, in which the filter kernel is scanned one pixel at a time, further comprising;
    means for evaluation the filter kernel at each pixel to obtain a filtered intensity value for each pixel in the input image.

12. The apparatus of claim 11, in which maxima and minima intensities correspond to the corners.

13. The apparatus of claim 11, further comprising:
    means for fitting a second order polynomial model to the intensities to determine locations of the corners to a sub-pixel resolution.

14. The apparatus of claim 1 in which the means for correcting the output images uses an inverted linear system model.

15. The apparatus of claim 1, further comprising:
    a second calibration pattern placed on the rear projection screen to calibrate the camera.

16. The apparatus of claim 15, in which the second calibration pattern is projected on a front surface of the rear projection screen.

17. The apparatus as of claim 1, in which the means for correcting fits the output images to a size of the rear projection screen.

18. The apparatus of claim 1, in which the means for correcting minimizes burn-in.

19. The apparatus as of claim 1, in which the means for correcting resizes output images in a letterbox format that is inside an area of the rear projection screen.

20. The apparatus of claim 1, in which the output images are in a letterbox format that is inside an area of the rear projection screen, and in which an intensity of a portion of the rear projection screen is an average of an intensity of output images.

21. The apparatus of claim 1, further comprising:
    a laser pointer configured to illuminate a laser dot on the rear projection screen; and
    means for defecting a location of the laser dot.

22. The apparatus of claim 21, further comprising:
    controlling the output images according to the location of the laser dot.

23. The apparatus of claim 1, in which an exposure time of the camera is less than a frame rate of the output images to produce partial input images, and further comprising:
    means for compositing the partial input images to produce complete input images.

24. The apparatus of claim 1, in which the calibration patterns have a plurality of resolutions.

25. The apparatus of claim 1, in which the calibration pattern is displayed as a positive Image and negative image pair, and further comprising:
   means for subtracting the positive image from the negative image to cancel effects of ambient background light.

26. The apparat its of claim 1, in which the camera measures an amount of ambient light, and further comprising:
   means for adjusting an intensity of the output images according to the measured ambient light.

27. A method for correcting convergence errors in a rear projection television, comprising:
   mounting a plurality of cathode ray tubes inside an enclosure, each cathode ray tube configured to project output images onto the rear projection screen using a corresponding electron beam, in which a deflection of the electron beam is controlled by signals, the signals for controlling the electron beam including coarse and fine saw-tooth signals for horizontal deflection, and coarse and fine saw-tooth signals for vertical deflection;
   generating calibration images for each cathode ray tube;
   acquiring an input image of each calibration image by a camera mounted inside the enclosure;
   measuring a distortion in each input image; and
   converting the output images of the plurality of cathode ray tubes by adjusting the signals controlling the corresponding electron beams according to the measured distortions.

* * * * *